No. 796,942. PATENTED AUG. 8, 1905.
F. W. STAFFORD & G. W. BAXTER.
CULTIVATOR ATTACHMENT.
APPLICATION FILED AUG. 26, 1904.

2 SHEETS—SHEET 1.

Frank W. Stafford and
George W. Baxter,
Inventors.

Witnesses
by C. A. Snow & Co.
Attorneys

No. 796,942. PATENTED AUG. 8, 1905.
F. W. STAFFORD & G. W. BAXTER.
CULTIVATOR ATTACHMENT.
APPLICATION FILED AUG. 26, 1904.

2 SHEETS—SHEET 2.

Witnesses
Frank W. Stafford
George W. Baxter, Inventors.
by C. A. Snow & Co.
Attorneys

UNITED STATES PATENT OFFICE.

FRANK W. STAFFORD AND GEORGE W. BAXTER, OF TARKIO, MISSOURI.

CULTIVATOR ATTACHMENT.

No. 796,942. Specification of Letters Patent. Patented Aug. 8, 1905.

Application filed August 26, 1904. Serial No. 222,312.

*To all whom it may concern:*

Be it known that we, FRANK W. STAFFORD and GEORGE W. BAXTER, citizens of the United States, residing at Tarkio, in the county of Atchison and State of Missouri, have invented a new and useful Cultivator Attachment, of which the following is a specification.

This invention relates to cultivator attachments; and it has for its object to provide a device by means of which disks may be quickly and satisfactorily substituted for the ordinary cultivator-blades when for any reason disks shall be preferred—such, for instance, as in the cultivation of small and young crops.

The invention consists in the improved construction and novel arrangement and combination of parts which will be hereinafter fully described, and particularly pointed out in the claim.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had without departing from the spirit or sacrificing the advantages of the invention.

Figure 1:
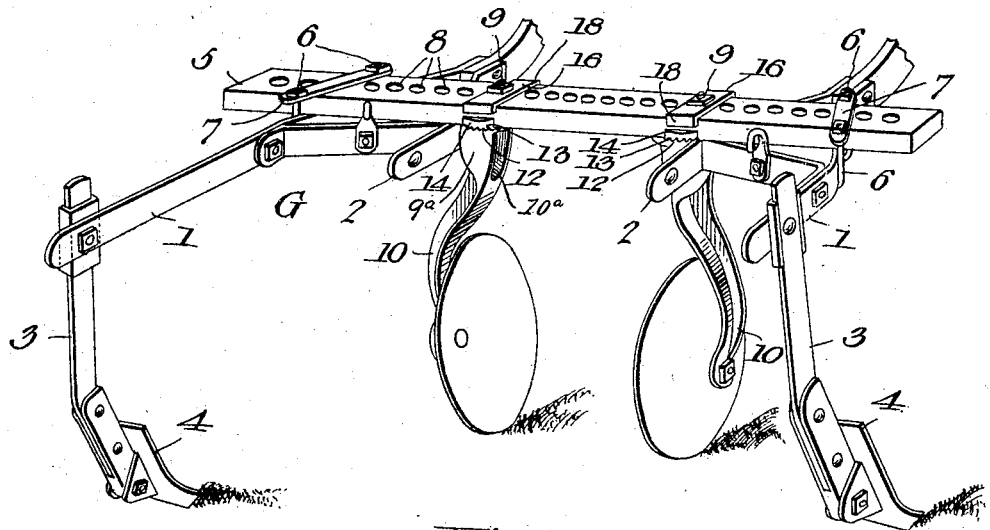
Figure 2:
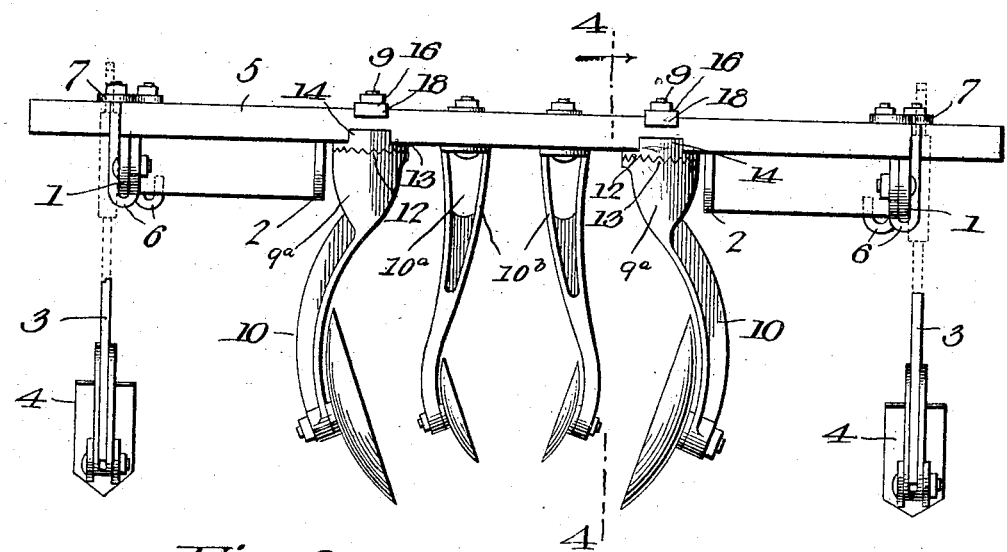
Figure 3:
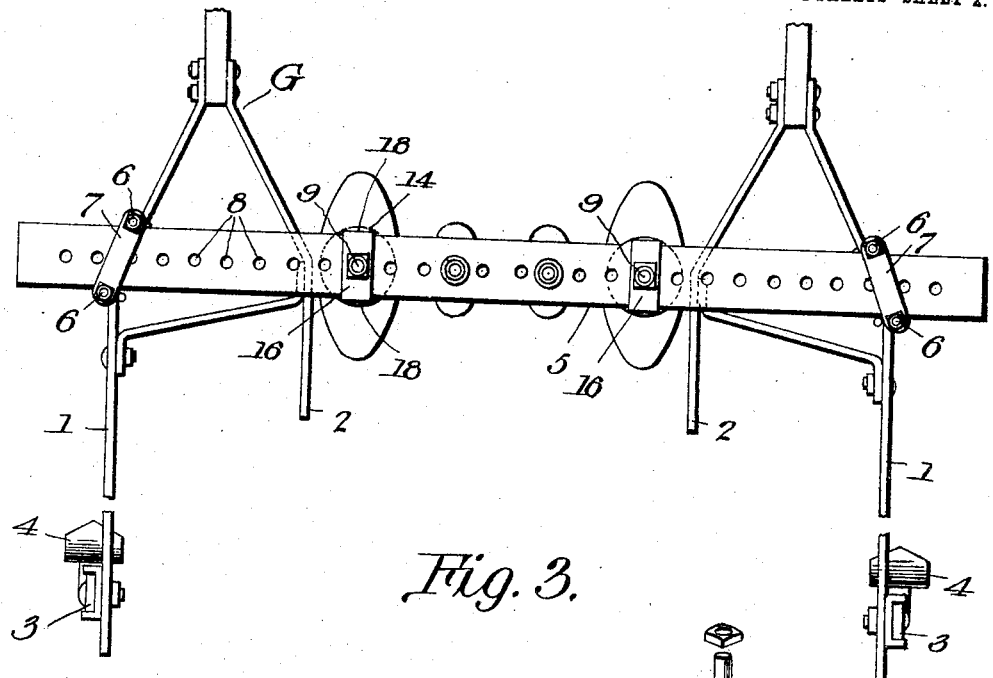
Figures 4, 5:
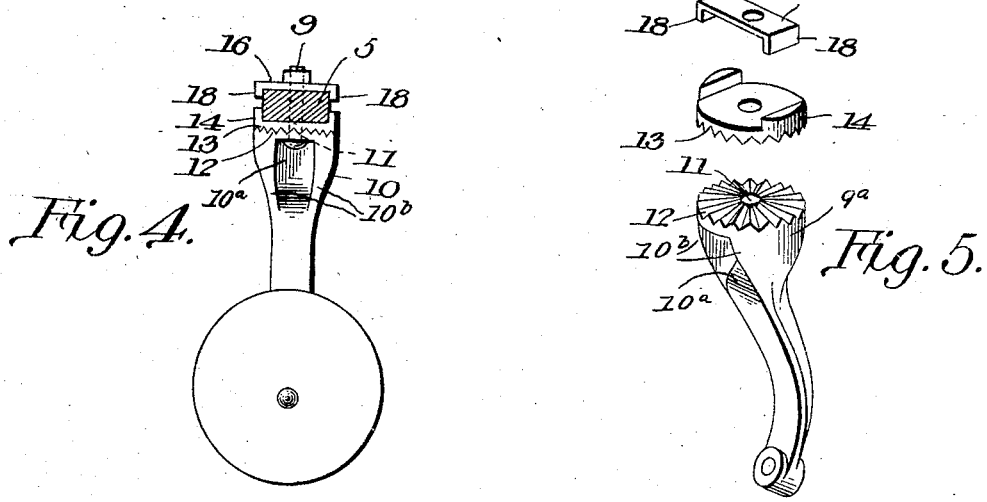

In said drawings, Figure 1 is a rear perspective of one gang of a riding-cultivator to which the improved attachment has been applied, the front shovels of the gang having been removed and the rear shovels of the gang having been suffered to remain in position. Fig. 2 is a rear elevation of a single cultivator-gang, having the attachment applied thereto in a modified form which involves the use of auxiliary disks for operating upon young crops. Fig. 3 is a plan view of the device illustrated in Fig. 2. Fig. 4 is a transverse sectional view taken on the line 4 4 in Fig. 2. Fig. 5 is a detail perspective view illustrating the various parts of the attachment separated from each other.

Corresponding parts in the several figures are indicated by similar characters of reference.

This invention is capable of application to any ordinary cultivator, whether riding or walking. For purposes of illustration a conventional form of riding-cultivator gang has been shown in the drawings and there designated G. The gang of the cultivator has in the illustrated example been shown as consisting of two main beams 1 1, each having auxiliary beams 2 securely bolted to or otherwise connected therewith. Each of the several beams and auxiliary beams is ordinarily provided with a standard 3, carrying a cultivator-blade 4. In Fig. 1 of the drawings only two rear blade-carrying standards have been shown, the others having been removed in order to give way to the attachment which forms the subject of the present invention. It is to be understood that one of these attachments is to be secured to or connected with each of the cultivator-gangs, as will be clearly seen by reference to Fig. 1. Each of the said attachments consists of a beam or bar 5 of proper dimensions, said beam or bar being advantageously made of two-by-four-inch lumber placed flatwise upon the cultivator-beams and secured to the latter by means of hook-bolts 6 and clip-plates 7, the hook-bolts catching under the cultivator-beams and extending upwardly through the clip-plates, to which they are secured by means of nuts. It will be seen that this bar or supporting element serves to secure the cultivator-beams rigidly with relation to each other, this being an important feature of the invention.

The supporting-bar 5 is provided with perforations 8 for the passage of bolts 9, whereby the disk-carrying shanks 10 are secured in position. Said shanks, which may either be straight or suitably curved, as shown in the drawings, are provided at their upper ends with heads or enlargements $9^a$, in the sides of which are formed recesses $10^a$, bounded at the sides thereof by flanges $10^b$, the upper ends of said heads or enlargements being provided with conveniently-accessible bolt-holes 11 for the passage of the bolts 9, which may be entered into the bolt-holes through the recesses $10^a$ between the flanges $10^b$. The upper extremities of the said disk-carrying shanks present flat round surfaces, pierced centrally by the bolt-holes 11 and provided with radial ribs 12, adapted to engage corresponding ribs 13 upon the under side of a washer 14, the upper side of which is adapted to lie in contact with the under side of the supporting-bar 5 and is provided with upstanding flanges bearing against opposite edges of said supporting-bar. 16 designates a clip-plate having a perforation 17 engaging the upper end of the bolt 9, said clip-plate being provided at the ends thereof with downturned flanges 18, engaging opposite edges of the supporting-bar 5.

It will be observed that by the herein-described attaching means the disk-carrying shanks may be easily and quickly connected with the supporting-bar 5 and that the said shanks may be set so as to present the disk mounted rotatably at the lower ends thereof at any desired angle to the line of progress. By providing in the supporting-bar any desired number of suitably-disposed perforations the location of the disk-carrying shanks may be changed according to present requirements.

In the practical carrying out of this invention it is obvious that it is applicable equally well to walking and riding cultivators and to cultivator-gangs of every construction. By this invention the ordinary cultivator may be easily and quickly transformed into a disk implement or one combining disks with shovels. As shown in Fig. 2 of the drawings, several disks may be substituted for each shovel removed from the beams.

The general construction of the device is simple and its operation in every respect satisfactory.

Having thus described the invention, what is claimed is—

The herein-described attachment for riding-cultivators, consisting of a bar adapted to rest upon and be secured to the cultivator-beams, said bar being provided throughout its length with perforations disposed closely together, in combination with washer-plates having upstanding flanges engaging the edges of the bar and provided with radial ribs upon their under sides, disk-carrying shanks having heads or enlargements provided with flat circular upper faces, radial ribs upon said faces, vertical bolt-holes and lateral recesses bounded by ribs or flanges and affording access to said bolt-holes, clip-plates engaging the upper side of the bar and having flanges engaging the edges of the latter, and bolts extending through said clip-plates, supporting-bar, washer-plates, and through the heads of the shanks, and connecting the same adjustably.

In testimony that we claim the foregoing as our own we have hereto affixed our signatures in the presence of two witnesses.

FRANK W. STAFFORD.
GEORGE W. BAXTER.

Witnesses:
J. D. RANKIN,
C. A. WILSON.